(12) United States Patent
Brown et al.

(10) Patent No.: US 8,085,267 B2
(45) Date of Patent: Dec. 27, 2011

(54) STOCHASTIC ADDITION OF RAYS IN A RAY TRACING IMAGE PROCESSING SYSTEM

(75) Inventors: Jeffrey Douglas Brown, Rochester, MN (US); Russell Dean Hoover, Rochester, MN (US); Eric Oliver Mejdrich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 11/668,522

(22) Filed: Jan. 30, 2007

(65) Prior Publication Data

US 2008/0180442 A1     Jul. 31, 2008

(51) Int. Cl.
*G06T 15/50* (2011.01)
(52) U.S. Cl. ........ 345/426; 345/419; 345/420; 345/421; 345/427; 345/502; 345/522; 345/589; 345/632; 382/291
(58) Field of Classification Search .................. 345/419, 345/420, 421, 423, 426, 427, 502, 522, 589, 345/632; 382/291
See application file for complete search history.

(56) References Cited

U.S. PATENT DOCUMENTS

| | | | |
|---|---|---|---|
| 5,305,430 A * | 4/1994 | Glassner | 345/427 |
| 5,729,672 A * | 3/1998 | Ashton | 345/589 |
| 6,373,485 B2 * | 4/2002 | Sowizral et al. | 345/421 |
| 6,429,864 B1 * | 8/2002 | Schwarzer | 345/419 |
| 6,466,227 B1 | 10/2002 | Pfister et al. | |
| 7,030,879 B1 * | 4/2006 | Pharr | 345/426 |
| 7,133,041 B2 | 11/2006 | Kaufman et al. | |
| 7,184,042 B2 * | 2/2007 | Keller | 345/426 |
| 2003/0227456 A1 * | 12/2003 | Gritz | 345/426 |
| 2004/0001062 A1 * | 1/2004 | Pharr | 345/426 |
| 2005/0007385 A1 * | 1/2005 | Aoyama | 345/632 |
| 2005/0278406 A1 * | 12/2005 | Keller | 708/444 |
| 2007/0182732 A1 * | 8/2007 | Woop et al. | 345/420 |
| 2008/0180441 A1 | 7/2008 | Brown et al. | |
| 2009/0167763 A1 * | 7/2009 | Waechter et al. | 345/426 |

OTHER PUBLICATIONS

Baines "Accelerated Ray Traced Animations Exploiting Temporal Coherence", Published Aug. 2005, pp. 1-70.*
Wald et al. "Interactive Rendering with Coherence Ray Tracing", The Eurographics Association and Blackwell published 2001, 12 pages.*
Muller et al. "Distributed Image Synthesis with Breadth-First Ray-Tracing and the Ray-Z-Buffer", published 1992.*
Foley et al. (NPL Doc, "KD-Tree Acceleration Structures for a GPU Raytracer"). ACM, 2005, pp. 16-22.*

(Continued)

*Primary Examiner* — Kimbinh T Nguyen
(74) *Attorney, Agent, or Firm* — Patterson & Sheridan LLP

(57) ABSTRACT

According to embodiments of the invention, rays may be stochastically culled before they are issued into the three-dimensional scene. Stochastically culling rays may reduce the number of rays which need to be traced by the image processing system. Furthermore, by stochastically culling rays before they are issued into the three-dimensional scene, minor imperfections may be added to the final rendered image, thereby improving the realism of the rendered image. Therefore, stochastic culling of rays may improve the performance of the image processing system by reducing workload imposed on the image processing system and improving the realism of the images rendered by the image processing system. According to another embodiment of the invention, the realism of images rendered by the image processing system may also be improved by stochastically adding secondary rays after ray-primitive intersections have occurred.

21 Claims, 14 Drawing Sheets

OTHER PUBLICATIONS

Ling "A Graphics Architecture for Ray Tracing and Photon Mapping", Published Aug. 2004, 55 pages.*

Subramanian et al. "Automatic Termination Criteria for Ray Tracing Hierarchies". Published 1991.*

Arvo, James et al., Particle Transport and Image Synthesis, ACM SIGGRAPH Computer Graphics, Aug. 1990, pp. 63-66, vol. 24, Issue 4, Association for Computing Machinery, New York, New York, US.

Iverson, Scott, Ray Tracing, Production Rendering, 2005, pp. 149-177, Springer London Limited, London, England.

Office Action history of pending U.S. Appl. No. 11/627,464, dates ranging from Sep. 8, 2009 to Sep. 23, 2010.

* cited by examiner

STOCHASTIC ADDITION OF RAYS IN A RAY TRACING IMAGE PROCESSING SYSTEM

BACKGROUND OF THE INVENTION

1. Field of the Invention

Embodiments of the invention generally relate to the field of image processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two-dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two-dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two-dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention a method of performing ray tracing is provided. The method generally comprising: issuing an original ray into a three-dimensional scene; if the original ray intersects a primitive contained within the three-dimensional scene, generating a first plurality of secondary rays comprising a combination of one or more of a reflected ray, a refracted ray and shadow rays corresponding to light sources; and issuing a superset of the secondary rays into the three-dimensional scene, wherein the superset includes one or more additional secondary rays stochastically generated and issued from a point the original ray intersected the primitive.

According to another embodiment of the invention a computer readable medium is provided. The computer readable medium containing a program which, when executed, performs operations generally comprising: issuing an original ray into a three-dimensional scene; tracing the original ray through a spatial index having nodes representing bounding volumes within the three-dimensional scene by taking branches to nodes defining bounding volumes intersected by the original ray until a first leaf node is reached; and performing ray-primitive intersection tests to determine if the original ray intersects a primitive contained within a bounding volume defined by the first leaf node; if the original ray intersects a primitive contained in the bounding volume, generating a first plurality of secondary rays comprising at least one of a reflected ray, a refracted ray, and a shadow ray; determining if an additional stochastic secondary ray is to be generated; and if so, generating an additional stochastic secondary ray.

According to another embodiment of the invention an image processing system is provided. The image processing system generally comprising: a spatial index having nodes representing bounding volumes within a three-dimensional scene; a first processing element configured to issue an original ray into the three-dimensional scene, traverse the original ray through the spatial index by taking branches to nodes representing bounding volumes intersected by the original ray until a first leaf node is reached, and send the original ray to a second processing element; and a second processing element configured to perform ray-primitive intersection tests to determine if the original ray intersects a primitive contained within a bounding volume defined by the first leaf node, if the original ray intersects a primitive contained in the bounding volume, generate a first plurality of secondary rays comprising at least one of a reflected ray, a refracted ray, and a shadow ray; determine if an additional stochastic secondary ray is to be generated; and if so, generate an additional stochastic secondary ray.

DETAILED DESCRIPTION OF THE PREFERRED EMBODIMENTS

Figure 1:
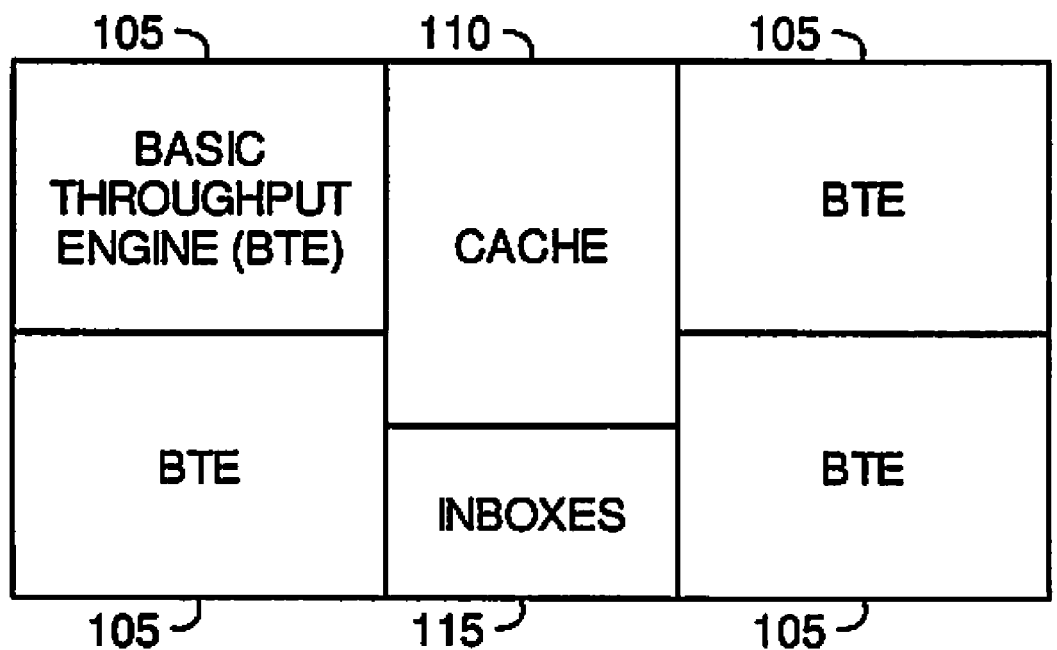
FIG. 1 is a block diagram depicting an exemplary computer processor, according to one embodiment of the invention.

Embodiments of the invention provide methods and systems to reduce workload experienced by a ray tracing image processing system and improve the realism of images rendered by the ray tracing image processing system. According to one embodiment of the invention, rays may be stochastically culled before they are issued into the three-dimensional scene. Stochastic culling may reduce the number of rays which need to be traced by the image processing system, thereby reducing the workload experienced by the ray-tracing image processing system. Furthermore, stochastic culling of rays may introduce minor imperfections in the final image rendered by the ray tracing image processing system. The minor imperfections may increase the realism of an image rendered by the image processing system. Therefore, stochastic culling of rays may improve the performance of the image processing system by reducing workload imposed on the image processing system and improving the realism of the images rendered by the image processing system.

According to another embodiment of the invention, the realism of images rendered by the image processing system may also be improved by stochastically adding a secondary ray after a ray-primitive intersection has occurred. The stochastic secondary ray may have a trajectory different than the traditional secondary rays issued by a ray tracing image processing system. Similar to stochastic culling of rays, the stochastically added secondary ray may also introduce minor imperfections in the final image rendered by the image processing system. The minor imperfections may improve the realism of the image rendered by the image processing system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the image processing system described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Multiple Core Processing Element

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element memory cache 110 (e.g., a shared L2 cache).

The BTEs 105 may also have access to a plurality of inboxes 115. The inboxes 115, described further below with regards to FIG. 3, may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low-latency and high-bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two-dimensional image from a three-dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three-dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. According to one embodiment of the invention, the vector throughput engines may then determine if the ray intersects a primitive contained within the bounding volume. The vector throughput engines may also perform operations relating to determining the color of the pixel through which the ray passed.

Figure 2:
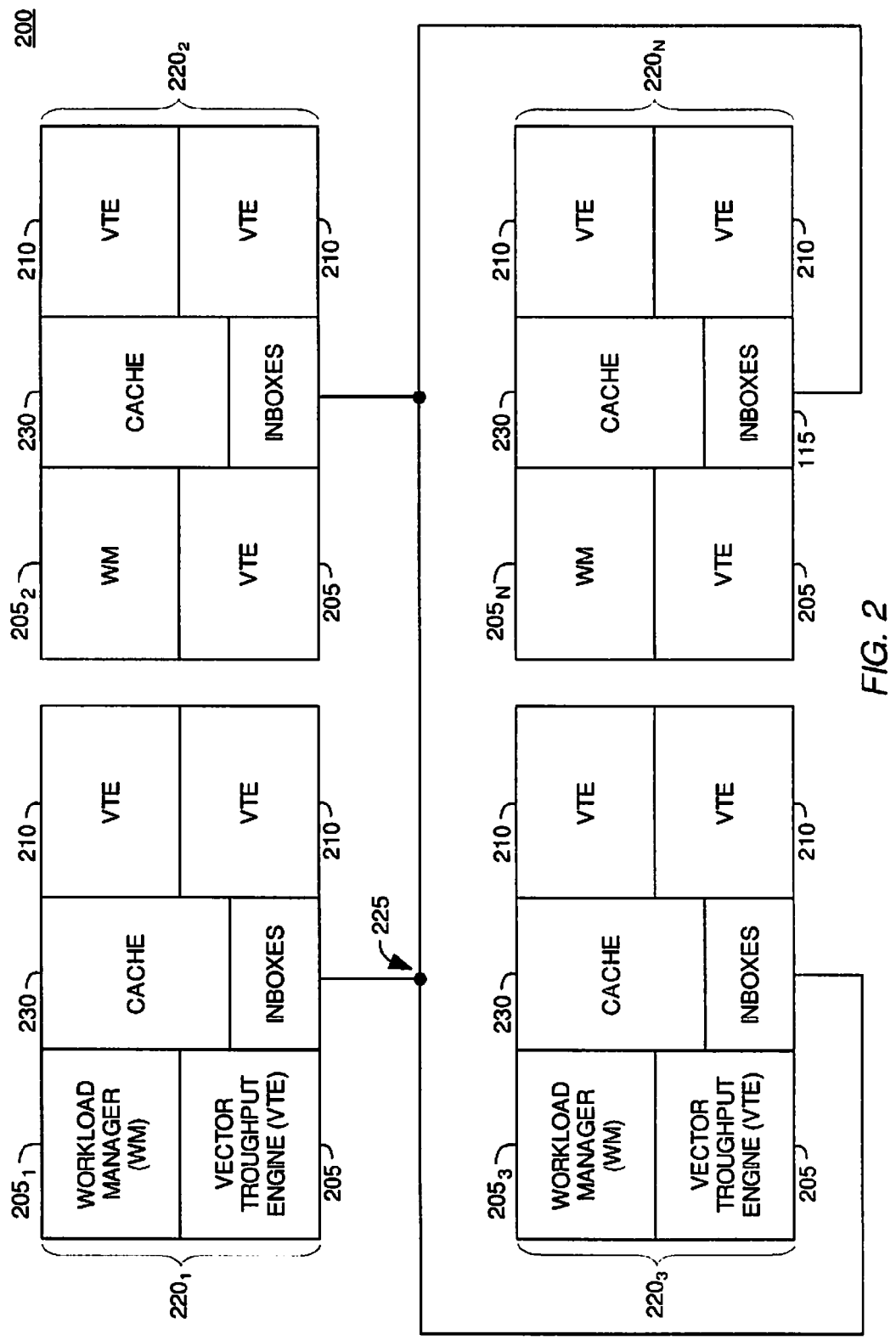
FIG. 2 illustrates a multiple-core processing element network, according to one embodiment of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each processor 220 in the network of multiple core processing elements 200 may also contain a plurality of vector throughput engines 210, according to one embodiment of the invention.

The workload managers $220_{1-N}$ may use a high speed bus 225 to communicate with other workload managers $220_{1-N}$ and/or vector throughput engines 210 of other multiple core processing elements 220, according to one embodiment of the invention. Each of the vector throughput engines 210 may use the high speed bus 225 to communicate with other vector throughput engines 210 or the workload managers 205. The workload manager processors 205 may use the high speed bus 225 to collect and distribute image processing related tasks to other workload manager processors 205, and/or distribute tasks to other vector throughput engines 210. The use of a high speed bus 225 may allow the workload managers $205_{1-N}$ to communicate without affecting the caches 230 with data packets related to workload manager 205 communications.

Low-Latency High-Bandwidth Communications Network

As described above, the aggregate performance of an image processing system may be tied to how well the BTEs can partition and redistribute work. According to one embodiment of the invention, memory space within a cache, referred to as a memory inbox, may be used to distribute work to a single processor thread. In an image processing system using a plurality of processors each having a plurality of threads, the collection of inboxes together may be referred to as a low-latency high-bandwidth communications network.

In multithreading processor such as a BTE 105, a memory inbox may be assigned to a given thread (referred to herein as the owner thread). In one embodiment of the invention, the memory space for the inbox may be allocated from the shared memory cache 110 exclusively to the owner thread. By exclusively assigning the memory space in a cache to the owner thread, the owner thread may maintain enough memory space to cache its own instructions and data without other having other competing threads displace the owner thread's instructions and data. Thus, the memory inbox may improve execution of the owner thread by maintaining the owner thread's data and instructions in the assigned inbox portion of the cache and reducing the possibility of stalling the owner thread while data and instructions for the owner thread are retrieved from higher levels of memory. Furthermore, by assigning the memory space in a cache to the owner thread, data or instructions intended for the targeted thread may be stored only in an inbox allocated to the thread. Thus, data or instructions intended for the targeted thread are not stored throughout the shared memory cache 110, rather only in the inbox allocated to the targeted thread.

Furthermore, the inbox memory may be used by other threads to efficiently communicate with the owner thread. For example, where another thread has data and/or instructions which are to be provided to the owner thread for an inbox, the other thread may send the data and/or instructions to the inbox where the data and/or instructions may be retrieved by the owner thread. Similarly, in some cases, the owner thread may use the inbox as an outbox to communicate information with other threads. For example, to communicate the information with another thread, the owner thread may place the information in the inbox and send a notification to the other thread indicating the location of the data and/or instructions, thereby allowing the other thread to retrieve the information. Optionally, the owner thread may provide the information directly to the inbox of the other thread. Thus, the inbox memory may be used to simplify communication between a sending and a receiving thread while preventing displacement of data and/or instructions being used by other threads.

Figure 3A:
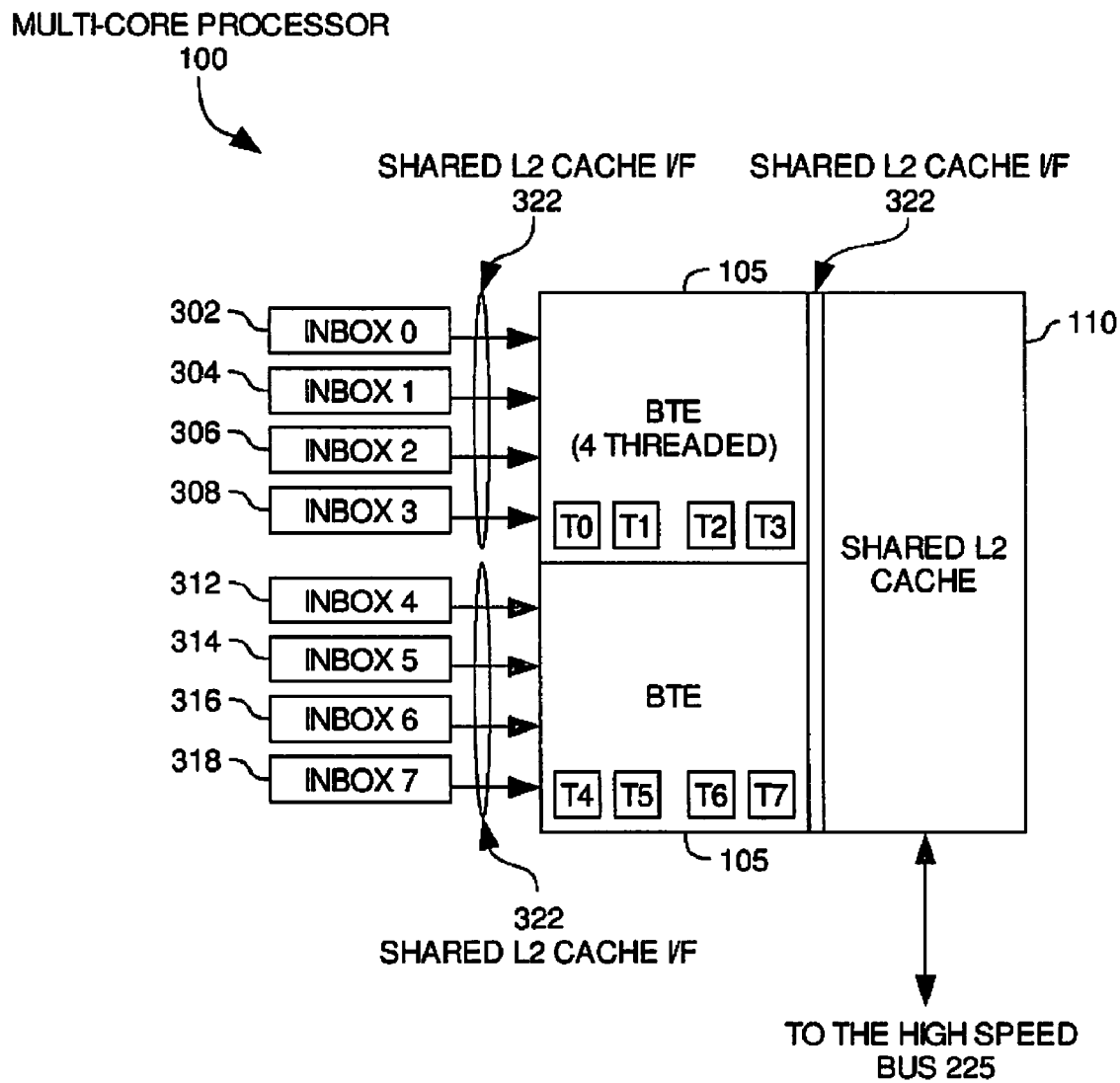
FIGS. 3A-3C are block diagrams illustrating aspects of memory inboxes according to one embodiments of the invention.

FIG. 3A is a block diagram of memory inboxes 302 . . . 318 in a multi-core processor element 100 according to one embodiment of the invention. The depiction of the memory inboxes 302 . . . 318 is intended to be a conceptual view and therefore is not limited to any particular physical configuration. As depicted, threads (e.g., threads T0-T7) executing in each core (e.g., the BTEs 105) may have access to the shared L2 cache 110 via a shared L2 cache interface 322. Furthermore, the L2 cache interface 322 may also be used by the threads T0 . . . T7 to access the corresponding memory inboxes 302 . . . 318. As described above, in some cases, each inbox 302 . . . 318 may be assigned to a corresponding thread T0-T7. Thus, Inbox 0 302 may be assigned to thread T0 and so on. As described below, by assigning a given inbox to a given thread, access to the assigned inbox may be unrestricted with respect to the owner thread while access by other threads may be restricted. Exemplary restrictions are described below in greater detail.

Figure 3B:
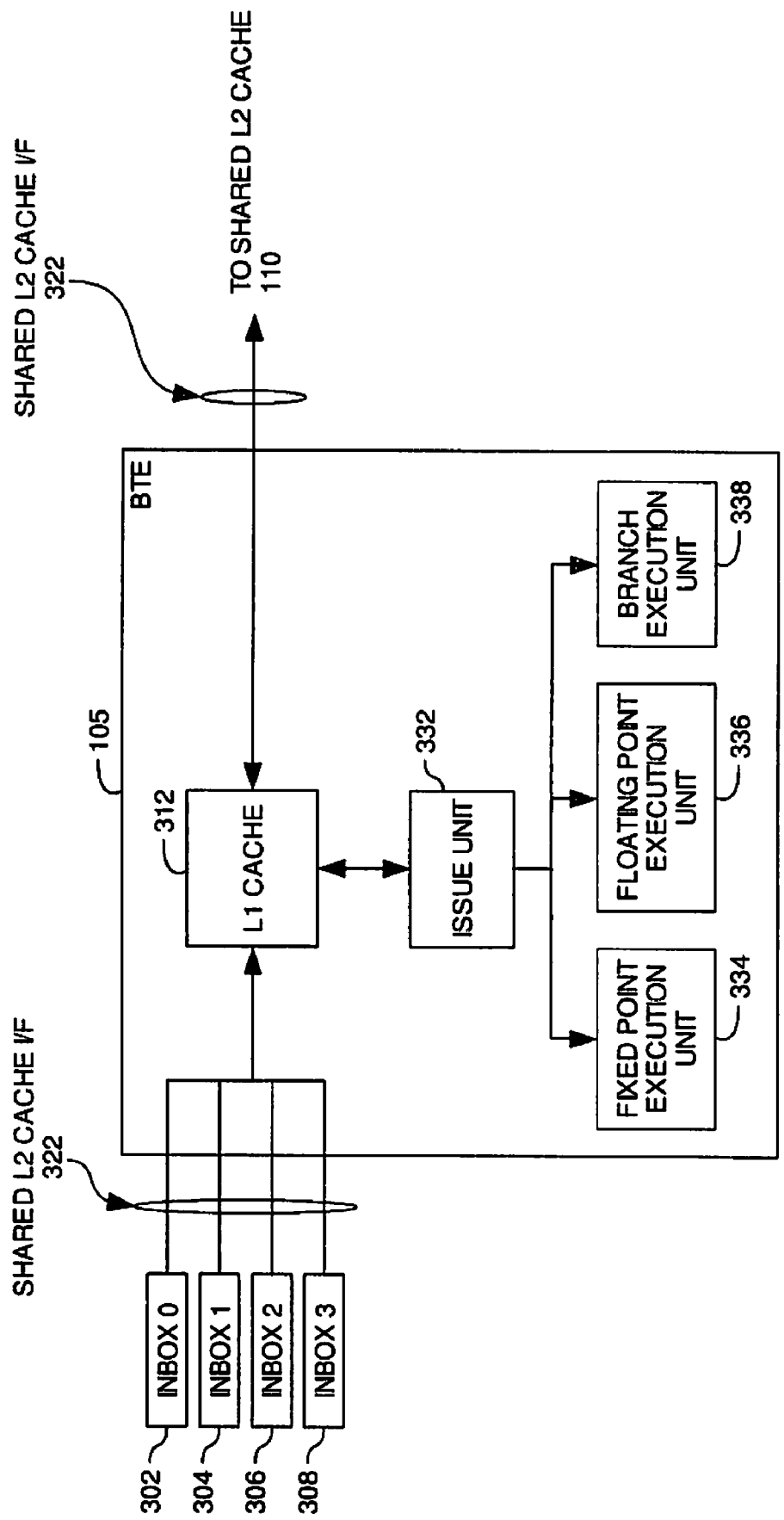

FIG. 3B is a block diagram depicting the path of data from memory inboxes (e.g., inboxes 302 . . . 308) and the shared L2 cache 110 transmitted to and from a processing core (e.g., BTE 105). As described above, both the memory inboxes 302 . . . 308 and the shared L2 cache 110 may be accessed via the shared L2 cache interface 322. Where a thread being executed in the BTE 105 retrieves data from an inbox 302 . . . 308 or from the shared L2 cache 110, the retrieved data may be placed in the L1 cache 312 for the BTE 105. Instructions for the thread may be issued from an issue unit 332. In some cases, the BTE 105 may be configured to execute multiple threads concurrently. Thus, the issue unit 332 may be configured to issue instructions for multiple threads. In some cases, the BTE 105 may provide multiple execution units 334 . . . 338 which may be used to concurrently execute threads in the BTE 105. The execution units 334 . . . 338 may include a fixed point execution unit 334, a floating point execution unit 336, and a branch execution unit 338.

In some cases, a thread may update or produce data which is to be accessed later (e.g., by the same thread or by another thread). Where the updated data is to be accessed later, the thread may place the updated data in an L1 cache 312. Furthermore, where desired, the updated data may also be placed in the L2 cache 110 or in an inbox 302 . . . 308 for the updating thread via the shared L2 cache interface 322. In some cases, as described above, direct access to a given inbox (e.g., inbox 0 302) via the shared L2 cache interface 322 may be limited to the thread (e.g., thread T0) which owns the given inbox.

In one embodiment of the invention, memory space within a memory inbox may be mapped to a global memory address (e.g., all levels of memory including the L1 cache 312, L2 cache 110, and main memory as well as all threads may use the same global memory address to access a given memory inbox). Thus, in one embodiment of the invention, to access the inbox memory space, the owner thread may merely read or write the desired information to a global memory address corresponding to the inbox memory space. A thread which does not own the memory inbox and which attempts to directly access the inbox via the global memory address, may have access to the inbox denied. Other forms of access may instead be provided to other non-owning threads, e.g., via packetized messages sent to the inbox.

Also, in one embodiment of the invention, information being stored in a memory inbox may not be cacheable. For example, while information in the L1 cache 312, L2 cache 110, and other memory level may be automatically cached by the multi core processing element 100 such that information requested from a given memory address may be automatically fetched from main memory and maintained in one of the cache levels 312, 110 while being accessed. In contrast, the globally addressable memory in a given inbox may only be located in the inbox and may not be moved between different levels of the memory hierarchy (e.g., the main memory, the shared L2 cache memory 110 or the L1 cache memory) without being copied to a new address space outside of the inbox. Thus, accesses to an inbox by an owner thread may be performed quickly and directly to the inbox memory without waiting for information to be fetched from another level of the memory hierarchy and/or translated during fetching. The non-cacheability of inbox memory may also apply with respect to packetized access of the inbox described below. Furthermore, in an alternate embodiment of the invention, information stored in the inbox may be cached in other levels of the memory hierarchy.

Assignment of Memory Boxes

Figure 3C:
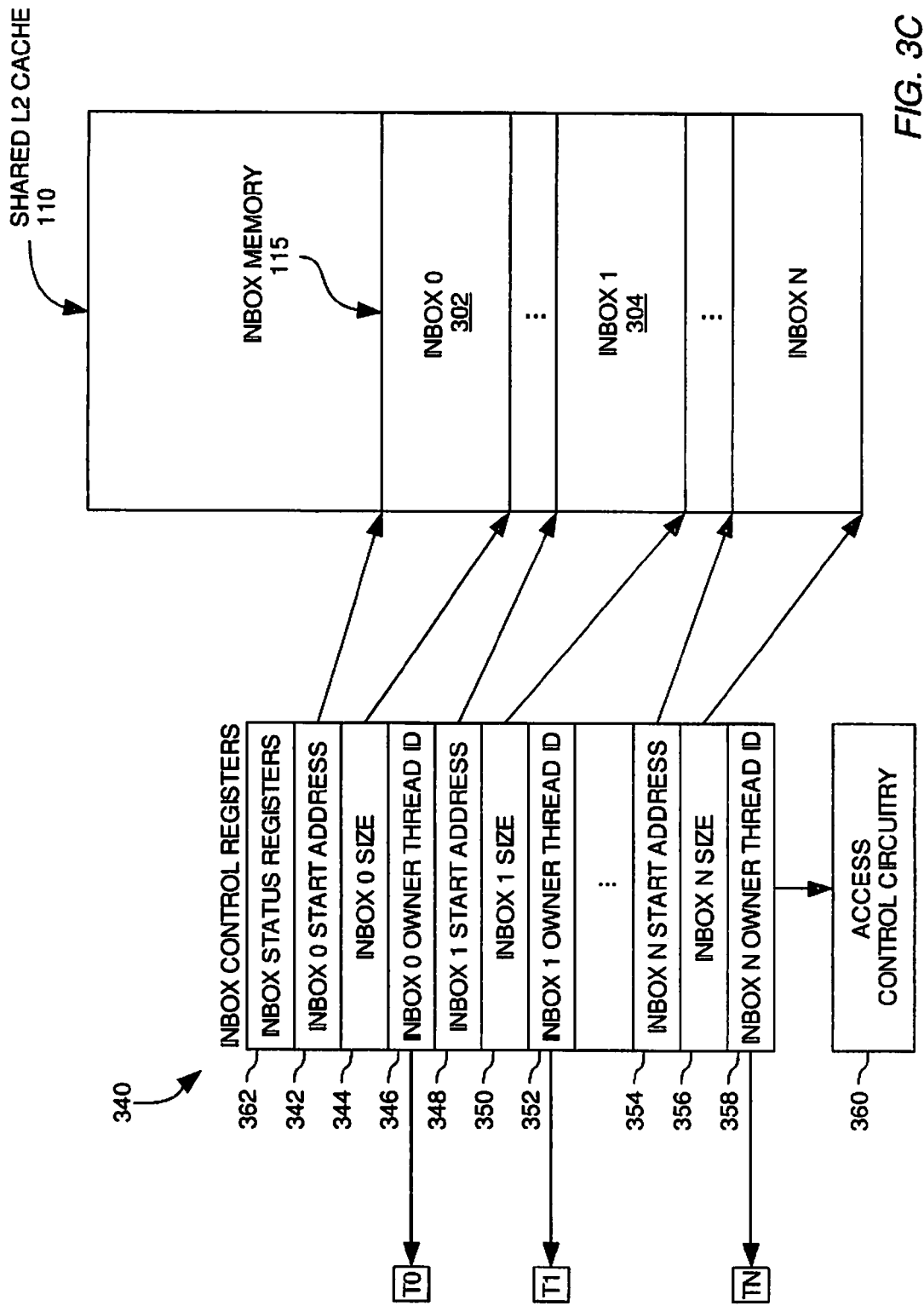

In one embodiment of the invention, memory inboxes may be provided from the shared memory cache 110 (e.g., a portion of the L2 cache 110 may be reserved for the inbox memory 115). FIG. 3C is a block diagram depicting inbox memory 115 partitioned from the shared L2 cache 110 according to one embodiment of the invention.

As depicted, the size and location of each inbox 302, 304, etc. may be controlled by inbox control registers 340. The status of each inbox 302, 304, etc. (e.g., enabled or disabled) may be indicated and/or modified via inbox status registers 362. In one embodiment, access to the inbox control registers 340 may be unrestricted. Optionally, in some cases, access to the inbox control registers may be limited, for example, to a subset of approved threads (e.g., the owner thread, a parent of the owner thread, a specially designated control thread, and/or an operating system kernel thread). In one embodiment, the inbox control registers 340 may include a start address register 342, 348 . . . 354, a size register 344, 350 . . . 356, and an owner thread identification register 346, 352 . . . 358.

In one embodiment, the start address registers 342, 348 . . . 354 may indicate a start address for each inbox 302, 304, etc. The size registers 344, 350 . . . 358 may indicate the size of a corresponding inbox 302, 304, etc. The memory space for an inbox may thus occupy each address beginning from the corresponding start address and ranging through the indicated size of the inbox. The size may be indicated in any manner, for example, as an absolute size in bytes or as an integer multiple of a fixed size (e.g., the size in the size registers 344, 350 . . . 358 may indicate the size in kilobytes).

In one embodiment, the owner thread identification register 346, 352 . . . 358 may identify which thread (e.g., thread T0, T1 . . . TN) owns a given inbox 302, 304, etc. While depicted with respect to threads and corresponding inboxes 1, 2 . . . N, an embodiment of the invention may be used with any type of thread and/or inbox identifier (e.g., a number, an address, etc.). In one embodiment of the invention, the inbox identifier register may be used to restrict direct access to memory addresses within the corresponding inbox to the owner thread. In some cases, direct access may also be allowed by a limited selection of other threads, such as, for example, a parent thread of the owner thread, a specified control thread, and/or an operating system kernel thread. In one embodiment, access control circuitry 360 may be used to provide the restricted access.

By assigning portions of the shared memory cache 110 to the inboxes a low-latency high-bandwidth communications network may be formed. The remaining portion of the shared memory cache 110 may remain unassigned and, thus, available to store information which does not relate to communications between processing threads. The remaining portion of the shared memory cache 110 may be used to store geometry and data structures which are used by the image processing system to perform ray tracing (described further below with respect to FIG. 5).

A benefit of using only the inboxes for communications between processing threads and using the remaining portion of the shared memory cache 110 to store geometry and data structures is that no matter how much communications related information is passed through the inboxes, it will not consume the entire memory cache. Thus, as will be described further below, communications related information will not displace the geometry and data structures stored within the remaining portion of the shared memory cache 100. Therefore, data which is likely to be reused when tracing subsequent rays or rendering subsequent frames (object geometry and data structures) may remain in the cache, while data which is unlikely to be reused when tracing subsequent rays or rendering subsequent frames (data processing work) will not remain in the cache.

An Exemplary Three-Dimensional Scene

Figure 4:
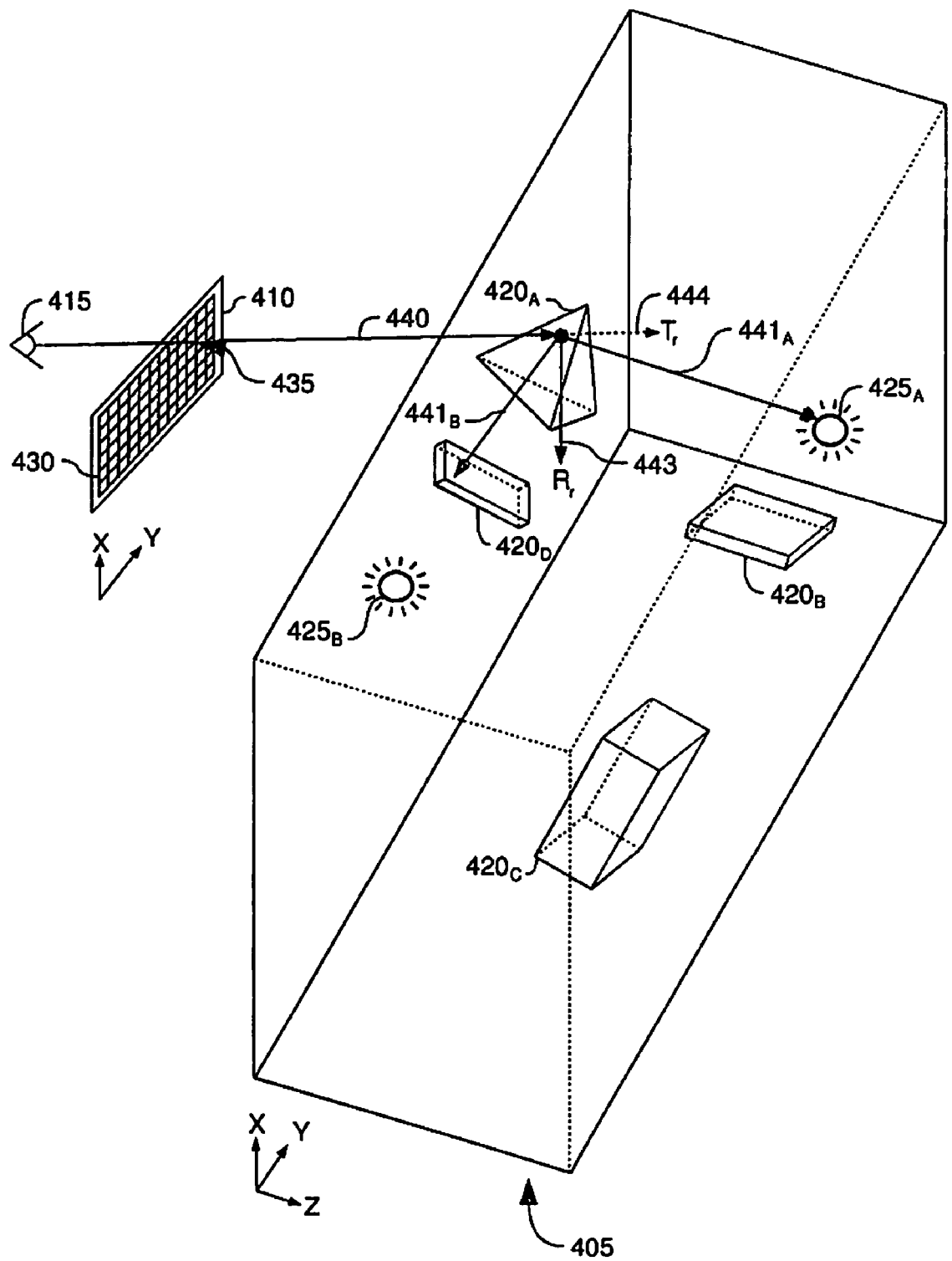
FIGS. 4, 7, 8, 10 and 11 are exemplary three-dimensional scenes to be rendered by an image processing system, according to one embodiment of the invention.

FIG. 4 is an exemplary three-dimensional scene 405 to be rendered by an image processing system. Within the three-dimensional scene 405 may be objects 420. The objects 420 in FIG. 4 are of different geometric shapes. Although only four objects 420 are illustrated in FIG. 4, the number of objects in a typical three-dimensional scene may be more or less. Commonly, three-dimensional scenes will have many more objects than illustrated in FIG. 4.

As can be seen in FIG. 4 the objects are of varying geometric shape and size. For example, one object in FIG. 4 is a pyramid $420_A$. Other objects in FIG. 4 are boxes $420_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 405 are light sources $425_{A-B}$. The light sources may illuminate the objects 420 located within the scene 405. Furthermore, depending on the location of the light sources 425 and the objects 420 within the scene 405, the light sources may cause shadows to be cast onto objects within the scene 405.

The three-dimensional scene 405 may be rendered into a two-dimensional picture by an image processing system. The image processing system may also cause the two-dimensional picture to be displayed on a monitor 410. The monitor 410 may use many pixels 430 of different colors to render the final two-dimensional picture.

One method used by image processing systems to rendering a three-dimensional scene 420 into a two-dimensional picture is called ray tracing. Ray tracing is accomplished by the image processing system "issuing" or "shooting" rays from the perspective of a viewer 415 into the three-dimensional scene 420. The rays have properties and behavior similar to light rays.

One ray 440, that originates at the position of the viewer 415 and traverses through the three-dimensional scene 405, can be seen in FIG. 4. As the ray 440 traverses from the viewer 415 to the three-dimensional scene 405, the ray 440 passes through a plane where the final two-dimensional picture will be rendered by the image processing system. In FIG. 4 this plane is represented by the monitor 410. The point the ray 440 passes through the plane, or monitor 410, is represented by a pixel 435.

As briefly discussed earlier, most image processing systems use a grid 430 of thousands (if not millions) of pixels to render the final scene on the monitor 410. Each individual pixel may display a different color to render the final composite two-dimensional picture on the monitor 410. An image processing system using a ray tracing image processing methodology to render a two-dimensional picture from a three-dimensional scene will calculate the colors that the issued ray or rays encounters in the three-dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 435 in the two-dimensional picture, the image processing system must determine if the ray 440 intersects an object within the scene. If the ray does not intersect an object within the scene it may be assigned a default background color (e.g., blue or black, representing the day or night sky). Conversely, as the ray 440 traverses through the three-dimensional scene the ray 440 may strike objects. As the rays strike objects within the scene the color of the object may be assigned the pixel through which the ray passes. However, the color of the object must be determined before it is assigned to the pixel.

Many factors may contribute to the color of the object struck by the original ray 440. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within the three-dimensional scene, secondary rays may be issued from the point where the original ray 440 intersected the object. For example, one type of secondary ray may be a shadow ray. A shadow ray may be used to determine the contribution of light to the point where the original ray 440 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 405. If the ray reaches the light source without encountering another object before the ray reaches the light source, then the light source will illuminate the object struck by the original ray at the point where the original ray struck the object.

For example, shadow ray 441 A may be issued from the point where original ray 440 intersected the object $420_A$, and may traverse in a direction towards the light source $425_A$. The shadow ray $441_A$ reaches the light source $425_A$ without encountering any other objects 420 within the scene 405. Therefore, the light source $425_A$ will illuminate the object $420_A$ at the point where the original ray 440 intersected the object $420_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $441_B$ may be issued from the point where the original ray 440 intersected with the object $420_A$, and may traverse in a direction towards the light source $425_B$. In this example, the path of the shadow ray $441_B$ is blocked by an object $420_D$. If the object $420_D$ is opaque, then the light source $425_B$ will not illuminate the object $420_A$ at the point where the original ray 440 intersected the object $420_A$. However, if the object $420_D$ which the shadow ray is translucent or transparent the light source $425_B$ may illuminate the object $420_A$ at the point where the original ray 440 intersected the object $420_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 444 is seen traversing through the object $420_A$ which the original ray 440 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 443 may be issued by the image processing system to determine what color or light may be reflected by the object $420_A$ which the original ray 440 intersected.

The total contribution of color and light of all secondary rays (e.g., shadow rays, transmitted rays, reflected rays, etc.) will result in the final color of the pixel through which the original ray passed.

An Exemplary KD-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three-dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 5A:
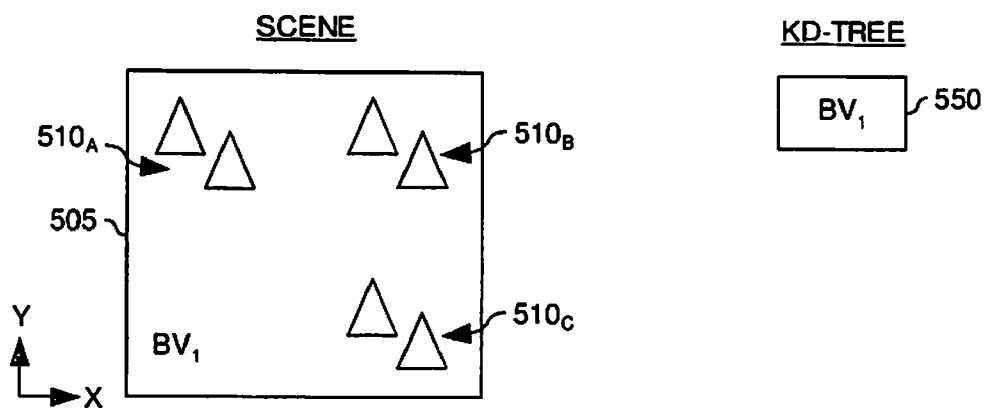
FIGS. 5A-5C illustrate a two-dimensional space to be rendered by an image processing system and a corresponding spatial index created by an image processing system, according to one embodiment of the invention.
Figure 5B:
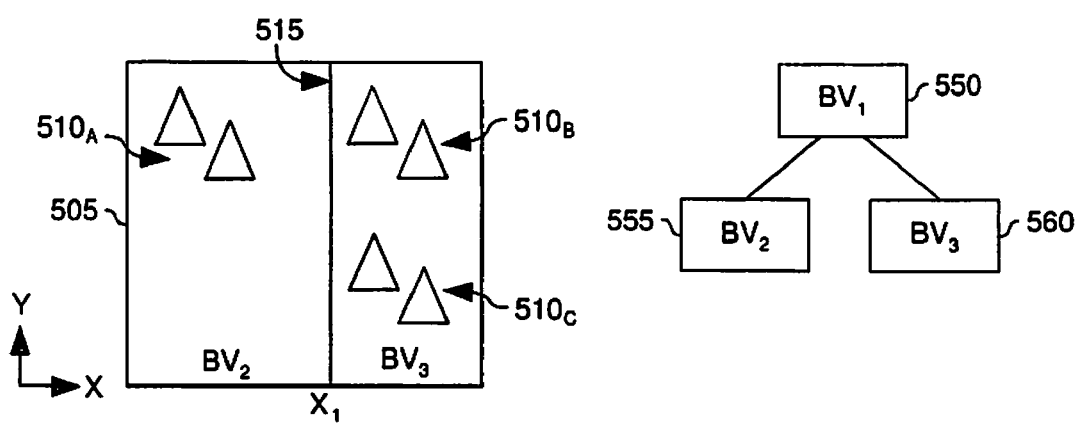
Figure 5C:
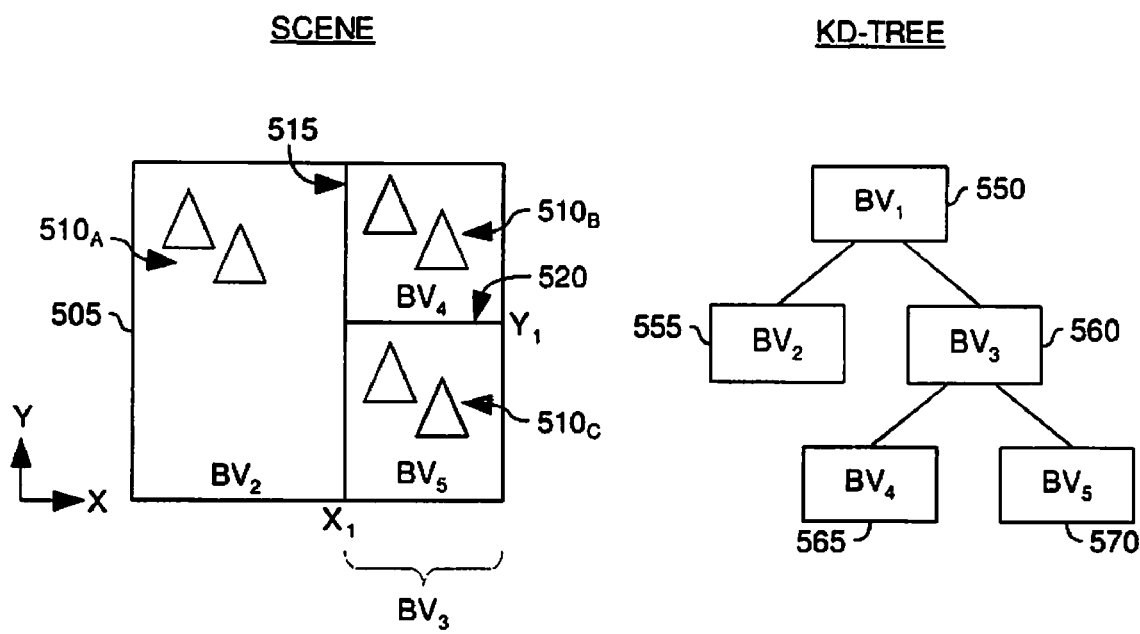

FIGS. 5A-5C illustrate a two-dimensional space to be rendered by an image processing system and a corresponding kd-tree. For simplicity, a two-dimensional scene is used to illustrate the building of a kd-Tree, however kd-Trees may also be used to represent three-dimensional scenes. In the two-dimensional illustration of FIGS. 5A-5C splitting lines are illustrated instead of splitting planes, and bounding areas are illustrated instead of bounding volumes as would be used in a three-dimensional structure. However, one skilled in the art will quickly recognize that the concepts may easily be applied to a three-dimensional scene containing objects.

FIG. 5A illustrates a two-dimensional scene 505 containing primitives 510 to be rendered in the final picture to be displayed on a monitor 510. The largest volume which represents the entire volume of the scene is encompassed by bounding volume 1 ($BV_1$). In the corresponding kd-Tree this may be represented by the top level node 550, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 5A, $BV_1$ contains six primitives, therefore kd-Tree construction algorithm may partition $BV_1$ into smaller bounding volumes.

FIG. 5B illustrates the same two-dimensional scene 505 as illustrated in FIG. 5A. However, in FIG. 5B the tree construction algorithm has partitioned $BV_1$ into two smaller bounding volumes $BV_2$ and $BV_3$. The partitioning of $BV_1$, was accomplished, by drawing a splitting plane $SP_1$ 515 along the x-axis at point $x_1$. This partitioning of $BV_1$ is also reflected in the kd-Tree as the two nodes 555 and 560, corresponding to $BV_2$ and $BV_3$ respectively, under the internal or parent node $BV_1$ 550. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives 510A). Nodes which are not partitioned or sub-divided any further, such as $BV_2$, are referred to as leaf nodes.

FIG. 5C illustrates the same two-dimensional scene 505 as illustrated in FIG. 5B. However, in FIG. 5C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 565 and 570, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives 510A, leaf node $BV_4$ may contain pointers to primitives $510_B$ and leaf node $BV_5$ may contain pointers to primitives $510_C$.

The resulting kd-Tree structure, or other spatial index structure, may be stored in the shared memory cache 110. The kd-Tree and the size of corresponding data which comprises the kd-Tree may be optimized for storage in the shared memory cache 110.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if a ray issued by the image processing system intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information (e.g., information defining the intersected leaf node) to a vector throughput engine 210 for ray-primitive intersection tests. The workload manager 205 may send the ray and associated information using the inboxes as described above. A ray-primitive intersection test may be executed by the vector throughput engine 210 to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

Stochastic Culling of Cast Rays with Increased Depth of Recursion

According to embodiments of the invention, a large number of original rays may be cast into the three-dimensional scene to render a final two-dimensional image (frame). Each of these original rays may be traversed through a spatial index (e.g., by a workload manager 205) until leaf nodes are reached. A determination may then be made (e.g., by a vector throughput engine 210) to determine if the ray intersects an object within a bounding volume defined by the leaf node. If the ray intersects an object within the bounding volume defined by the leaf node, the image processing system (e.g., a vector throughput engine 210) may cast (issue into the scene) additional rays (secondary rays) to determine if other objects or light sources contribute color to the object at the point the original ray intersected the object.

For example, the image processing system may cast secondary rays including a refracted ray, a reflected ray, and shadow rays to determine additional color contribution to the color of the object. As these secondary rays travel through the three-dimensional scene, they may intersect other objects within the scene. If these secondary rays intersect objects, the image processing system may then cast additional secondary rays (second level of recursion) to determine if other objects or light sources contribute color to the object intersected by the secondary ray and, thus, to the pixel through which the original ray passed. These additional secondary rays may also intersect objects, thereby causing more secondary rays (third level of recursion) to be issued into the three-dimensional scene. Thus, as previously issued rays (original or secondary) intersect objects within the three-dimensional scene, the image processing system recursively issues more rays into the three-dimensional scene.

The more levels of recursion (i.e., the more secondary rays issued into the scene), the more accurately the rendered image represents the three-dimensional scene. However, the deeper the level of recursion from which a secondary ray was generated, the less color contribution the secondary ray has to the color of the pixel through which the original ray passed.

In addition to accurate rendering of the three-dimensional scene, a competing performance measure for the image processing system may be the time necessary to render an image from the three-dimensional scene. The image processing system may have a limited amount of time to render the two-dimensional image from the three-dimensional scene. However, as the image processing system adds levels of recursion (i.e., due to secondary ray-primitive intersections) the workload required to render the image is increased, thereby increasing the time required to render the image.

If the image processing system is used in a game system, for example, the image processing system may have to render multiple frames per second in order to achieve realistic animation (e.g., 60 frames per second). Consequently, in some circumstances it may be desirable to reduce the time required to render the two-dimensional image form the three-dimensional scene in order to achieve realistic animation. According to embodiments of the invention, the image processing system may reduce the time required to render the scene by reducing the number of secondary rays which are issued into the three-dimensional scene by the image processing system.

According to one embodiment of the invention, the image processing system may reduce the number of secondary rays by stochastically culling (e.g., randomly deleting) secondary rays before they are issued into the three-dimensional scene. Consequently, the number of secondary rays processed by the image processing system may be reduced. In contrast to diminishing realism of the image rendered by the image processing system due to decreasing the number of secondary rays, the realism of the rendered image may actually be improved by culling secondary rays. Culling secondary rays may prevent the rendered image from looking "too perfect." Therefore, by reducing the number of secondary rays, the workload experienced by the image processing system may be reduced and, thus, the time required to render the two-dimensional image from the three-dimensional scene may be reduced.

Figure 6:
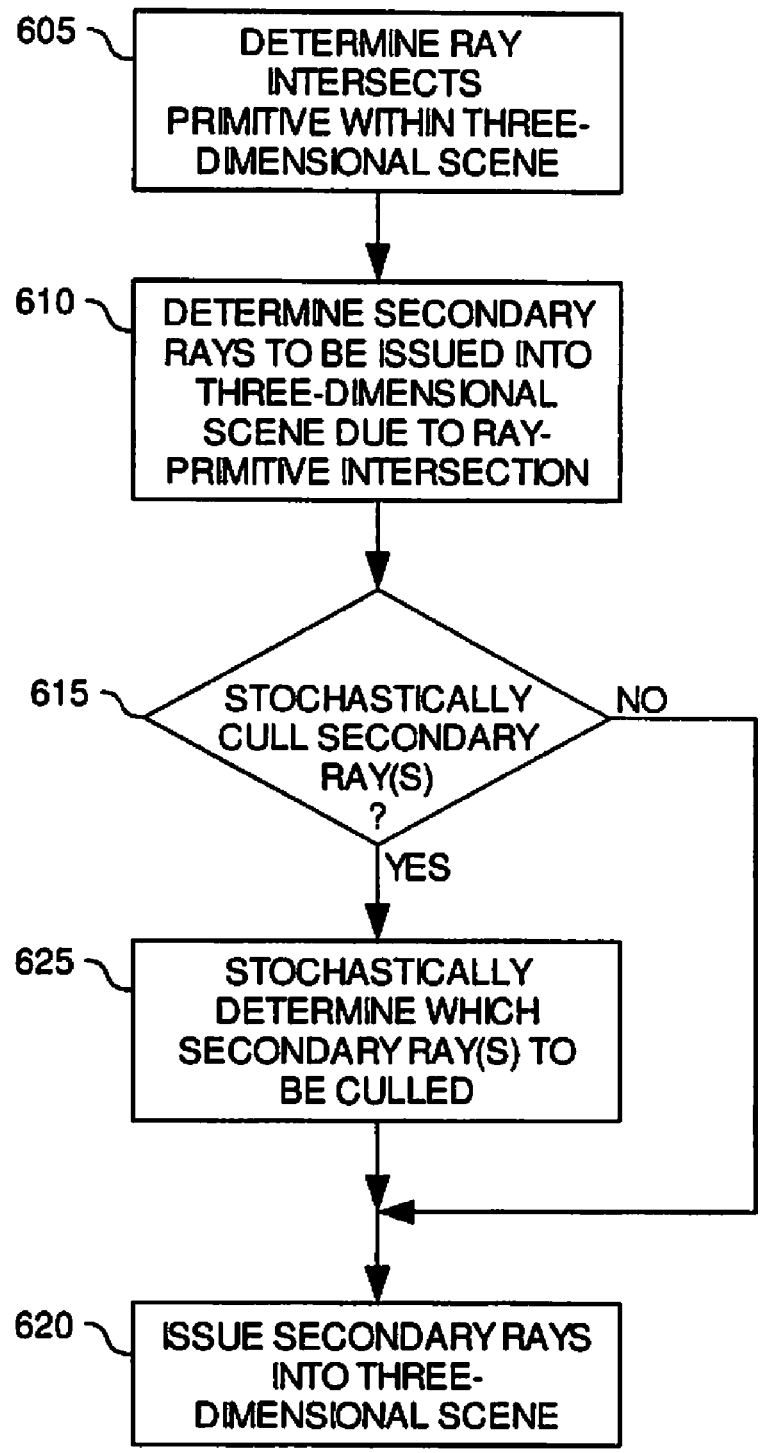
FIG. 6 is a flowchart illustrating an exemplary method of stochastically culling a secondary ray, according to one embodiment of the invention.

FIG. 6 illustrates an exemplary method 600 of stochastically culling secondary rays, according to one embodiment of the invention. The method 600 begins at step 605 when the image processing system determines that a ray intersects a primitive within the three-dimensional scene. For example, a vector throughput engine 210 may determine by executing ray-primitive intersection tests that a ray intersects a primitive in the three-dimensional scene. Next, at step 610, the image processing system may determine the secondary rays which may be issued into the three-dimensional scene due to the ray-primitive intersection.

Figure 7:
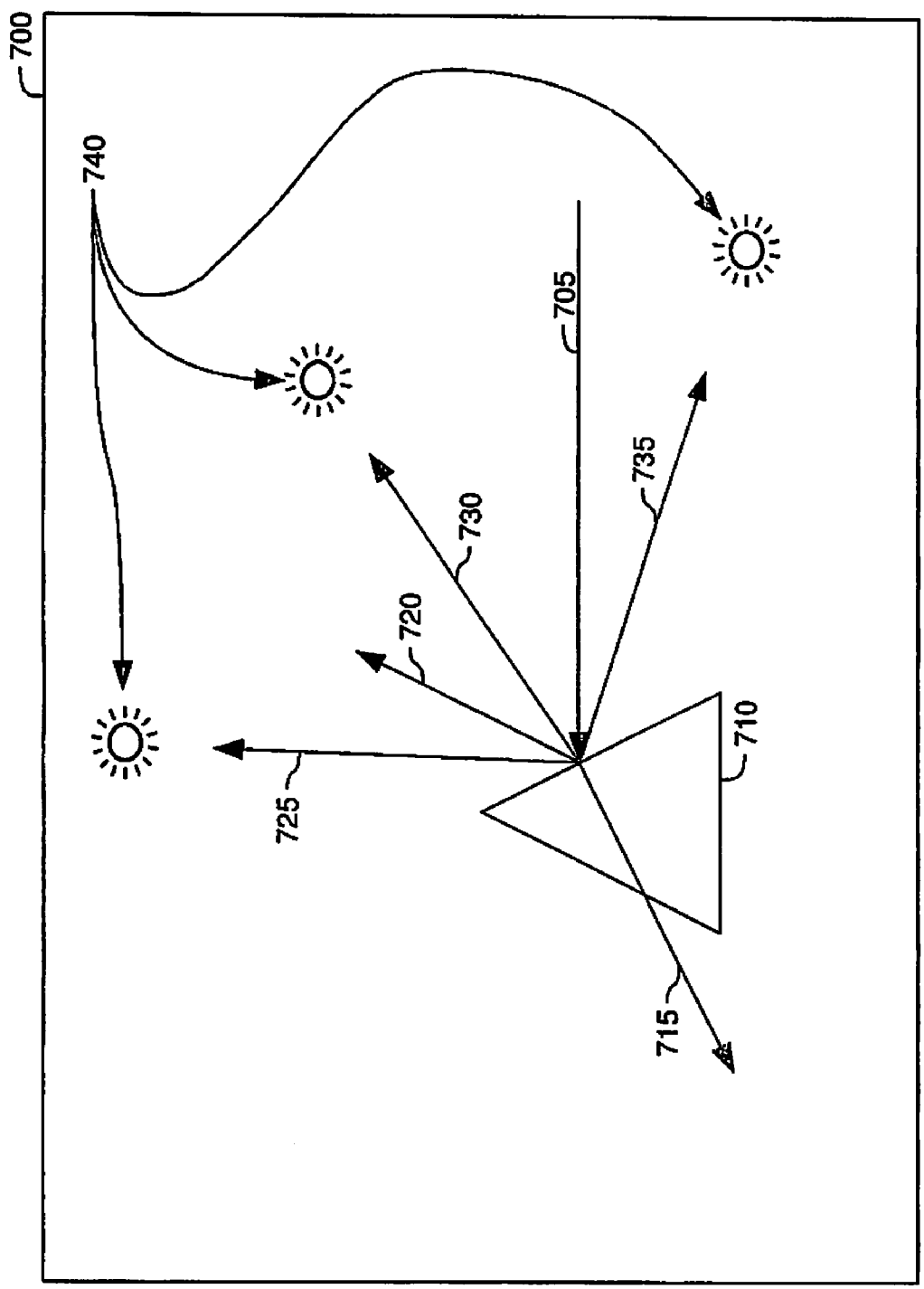

For example, FIG. 7 illustrates a ray 705 which has intersected a primitive 710 in a three-dimensional scene 700. The ray 705 may be an original ray which passed through a pixel as it was issued into the three-dimensional scene 700. Thus, the secondary rays cast into the three-dimensional scene 700 in response to the ray-primitive intersection may be the first level of recursion. However, the ray 705 may be a secondary ray which was cast into the three-dimensional scene in response to an earlier ray-primitive intersection (e.g., an intersection of an original ray and a primitive), and, thus, the secondary rays cast into the three-dimensional scene 700 in response to the ray-primitive intersection may be, for example, the second level of recursion.

Regardless of the level or depth of recursion, at step 610, the image processing system may determine that several secondary rays may be issued into the three-dimensional scene 700 in response to the intersection of the ray 705 and the primitive 710. The determination may be made based on the properties of the primitive 710 and the location of light sources within the three-dimensional scene 700. For example, the image processing system may determine that a refracted ray 715, a reflected ray 720, and three shadow rays (i.e., 725, 730 and 735) may be issued into the three-dimensional scene. The shadow rays may originate from the intersection point of the ray 705 and the primitive 710 and proceed towards light sources 740 within the three-dimensional scene 700.

After the image processing system has determined the secondary rays which may be issued into the three-dimensional scene due to the intersection of the ray 705 and the primitive 710, the image processing system may proceed to step 615 to stochastically determine whether or not a secondary ray or secondary rays are to be stochastically culled (deleted).

If the image processing system determines that a secondary ray will not be culled, the image processing system may proceed to step 620 where all of the secondary rays may be issued into the three-dimensional scene.

However, if the image processing system determines that a secondary ray or secondary rays are to be culled, the image processing system may proceed to step 625, to determine which of the secondary rays to cull.

According to one embodiment of the invention, any of the secondary rays may be a candidate to be culled, and thus may not be issued into the three-dimensional scene. Furthermore, embodiments of the invention may also assign a culling probability to each secondary ray. The culling probability may be used by the image processing system when determining which secondary ray should be culled. The probability associated with each secondary ray may be the same for each secondary ray or may vary depending on the type of secondary ray.

For example, reflected rays may have a first culling probability, refracted rays a second culling probability, and shadow rays a third probability. The image processing system may adjust each culling probability independently depending on the amount of workload needing to be reduced or dependent on a desired visual effect.

For example, a higher probability for culling shadow rays may decrease the contribution of color from light sources within the three-dimensional scene. Thus, a higher probability for culling shadow rays may create a higher contrast in the final image rendered from the three-dimensional scene. A higher culling probability for reflected or refracted rays may reduce workload more than shadow rays, because shadow rays may not cause new secondary rays to be issued if the shadow ray reaches a light source wherein reflected or refracted rays may cause new secondary rays to be issued when they intersect primitives.

According to embodiments of the invention, the culling probability associated with each ray may also vary corresponding to the depth or level of recursion from which the secondary ray is generated. For example, a secondary ray which is generated from an intersection of an original ray and a primitive (i.e., first level of recursion) may have a lower culling probability than, for example, a secondary ray which is generated from an intersection of a secondary ray and a primitive (e.g., second level of recursion). Thus, secondary rays from a deeper level of recursion which have a smaller contribution to the color of the pixel through which an original ray passed may be more likely to be culled. Consequently, due to increased culling probability with higher depth of recursion, very little color contribution to the pixel may be lost while a relatively large reduction of workload may occur.

Although embodiments of the invention have been described as culling a single ray per ray-primitive intersection, other embodiments are contemplated which may stochastically cull less rays when rendering images from a three-dimensional scene. Furthermore, other embodiments of the invention may stochastically cull more than a single secondary ray per ray-primitive intersection when rendering images from a three-dimensional scene. The number of rays culled per ray-primitive intersection may be determined by a workload being experienced by the image processing system.

After determining the secondary ray or rays to be culled, the image processing system may proceed to step 620. At step 620, the image processing system may issue all of the secondary rays into the three-dimensional scene except for the culled secondary ray or rays. The image processing system may issue the secondary rays into the three-dimensional scene, for example, by having a vector throughput engine 210 send the issued secondary rays to a workload manager 205 such that the workload manager 205 may traverse the secondary rays through the spatial index.

By not issuing a culled secondary ray into the three-dimensional scene, the image processing system (e.g., a workload manager 205) may not have to traverse the culled secondary ray through the spatial index, and the image processing system (e.g., a vector throughput engine 210) may not have to perform ray-primitive intersection tests with the culled secondary ray. Furthermore, any additional secondary rays which may have been issued due to an intersection of the culled secondary ray and a primitive are also eliminated. Consequently, the image processing system reduces the amount of workload required to render the two-dimensional image from the three-dimensional scene.

Figure 8:
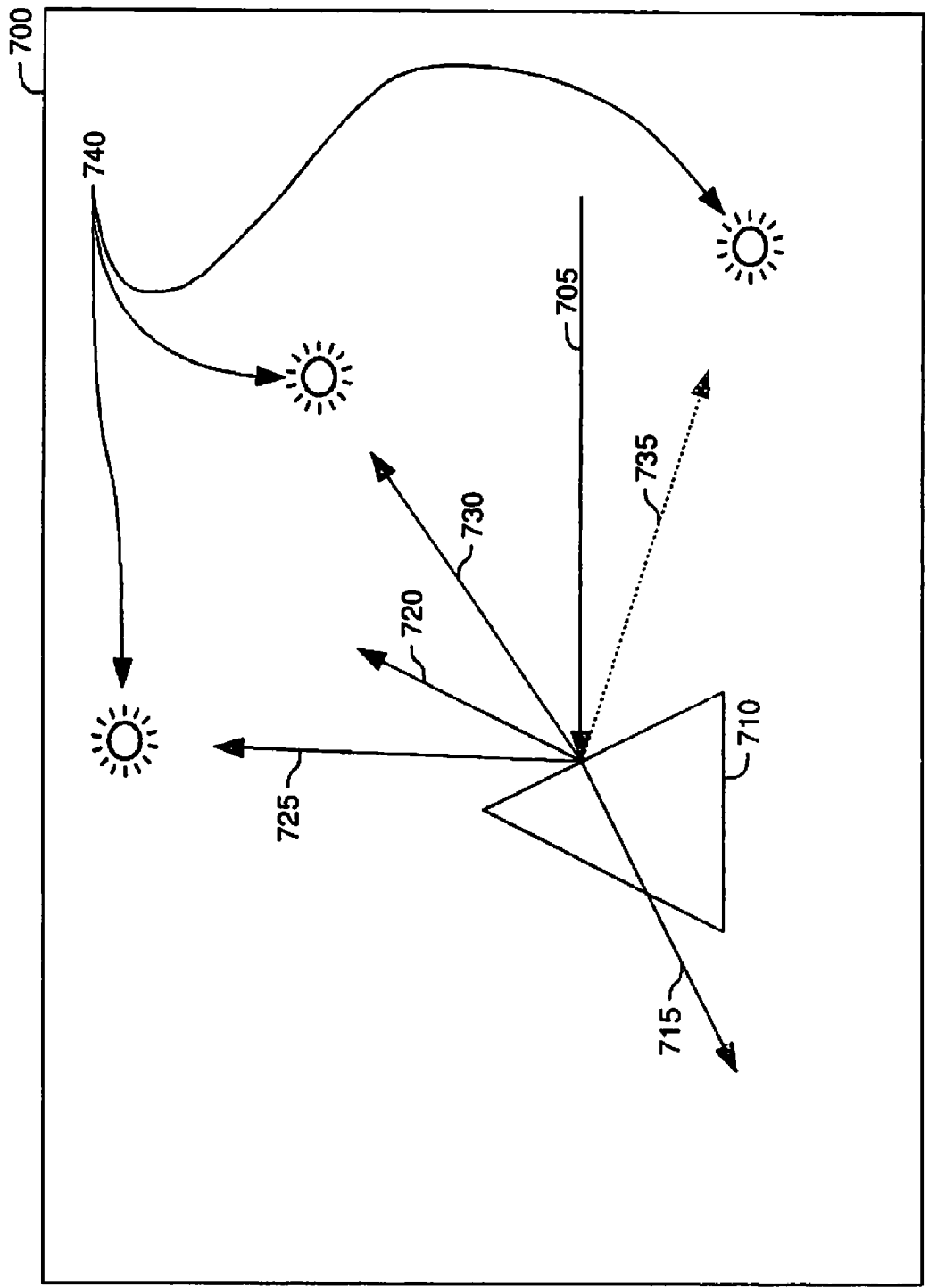

FIG. 8 illustrates an exemplary deletion of a secondary ray. As illustrated, the image processing system may determine in step 615 to cull one of the shadow rays. Specifically, the image processing system may determine in step 615 to cull the shadow ray 735, as illustrated by the dashed ray in FIG. 8. Therefore, the image processing system may not issue the shadow ray 735 into the three-dimensional scene 700 at step 620. Consequently, the image processing system may not have to traverse the shadow ray through the spatial index and the image processing system may not have to perform ray-primitive intersection tests with the shadow ray 735.

In additional to decreasing workload experienced by the image processing system, stochastically culling secondary rays may also increase the realism of images rendered by a ray tracing image processing system. The realism of the rendered image may be improved due to imperfections implanted into the rendered image as a result of culling rays from the three-dimensional scene, preventing the scene from looking "too perfect."

In contrast to a traditional ray tracing algorithm which may issue all secondary rays and trace all secondary rays until they either intersect an object or leave the three-dimensional scene, a ray tracing image processing system which stochastically culls rays may render an image with slight imperfections. These imperfections implanted into the three-dimensional scene may better simulate a real world environment than an image processing system which does not stochastically cull rays from the ray tracing process.

For example, a game system which builds a three-dimensional scene may attempt to simulate reality by placing objects within the three-dimensional scene which imitate objects in the real world. The game system may simulate a basketball game by placing a spherical object representing the basketball in the three-dimensional scene. The image processing system may use the dimensions of the spherical object when performing ray-tracing to render the two-dimensional image. Consequently, the image rendered by the traditional ray tracing image processing system may contain a perfectly spherical basketball. However, in the real world, basketballs are not perfectly spherical. Therefore, the image rendered by the traditional ray tracing image processing system may not realistically simulate the real world environment.

However, by stochastically culling rays when performing ray tracing, minor imperfections may be added to the final rendered image. The imperfections are added when the color which may have been contributed to a pixel by a secondary ray is not contributed to the pixel because the secondary ray was stochastically culled. These imperfections may eliminate, for example, the perfectly spherical objects within the final scene. Therefore, an imperfect final image is rendered, which may be more realistic than an image rendered by a traditional ray tracing image processing system which does not stochastically cull rays.

Additional Stochastic Secondary Rays

According to one embodiment of the invention, to improve realism of an image rendered by a ray tracing image processing system, additional secondary rays may be stochastically added after ray-primitive intersections. The stochastically added secondary rays may also provide realism to the three-dimensional scene by adding additional (unexpected) color to the image rendered by the ray-tracing image processing system. In contrast to a traditional ray tracing image processing system which only adds color to a pixel based on intersections of original rays or intersections of traditional secondary rays (i.e., reflected rays, refracted rays, and shadow rays), the additional color from the stochastically generated additional secondary rays may add realism to the rendered image.

According to embodiments of the invention, a stochastically added secondary ray may be issued into the scene after a previously issued ray (e.g., an original ray or previously issued secondary ray) intersects a primitive within the three-dimensional scene. The stochastically added secondary ray may have a trajectory which may also be stochastic. Furthermore, the stochastically added secondary ray may originate from the ray-primitive intersection point and may have a trajectory different than the trajectory of the traditional secondary rays generated in response to the ray-primitive intersection (i.e., reflected, refracted, and shadow rays).

Figure 9:
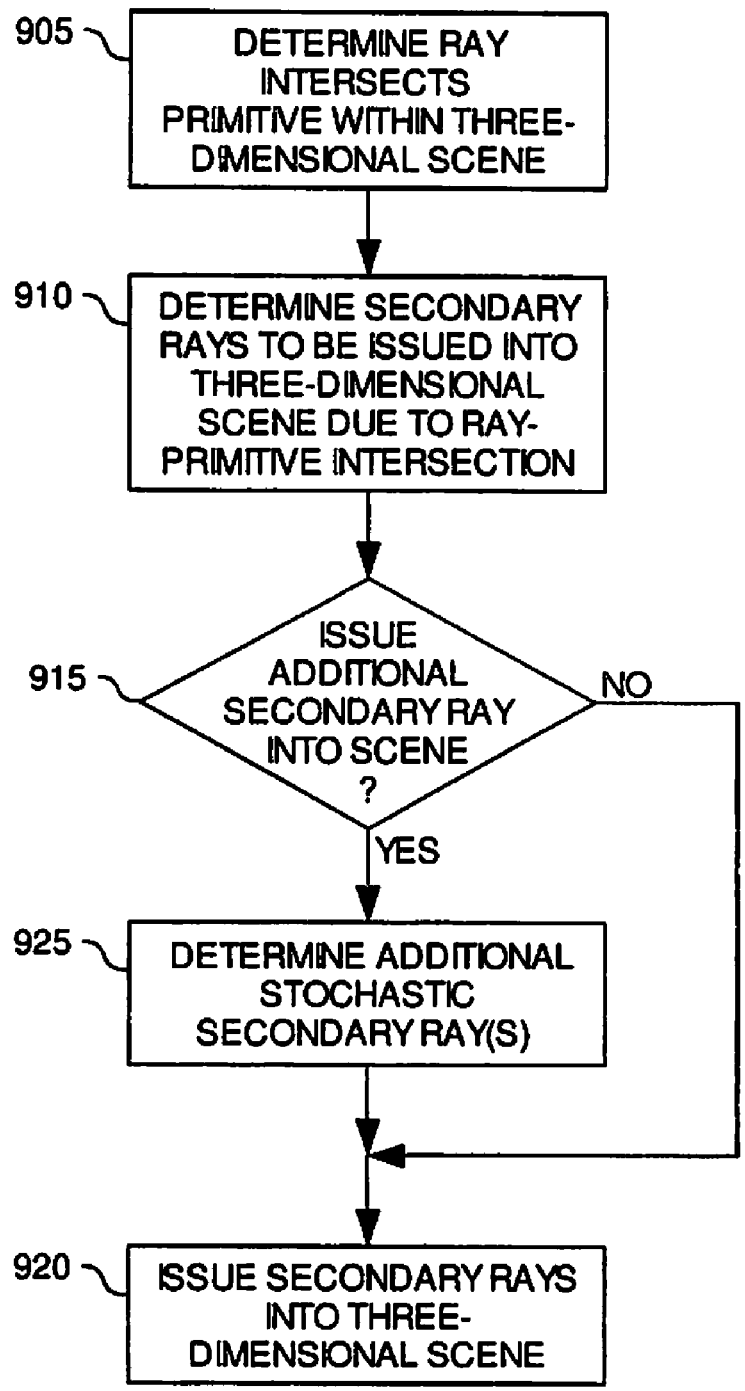
FIG. 9 is a flowchart illustrating an exemplary method of issuing a stochastically added secondary ray into a three-dimensional scene, according to one embodiment of the invention.

FIG. 9 illustrates a method 900 of stochastically generating an additional secondary ray, according to one embodiment of the invention. The method 900 begins at step 905, where the image processing system may determine that a ray intersects a primitive within the three-dimensional scene. Next, at step 910, the image processing system may determine the traditional secondary rays which may be issued into the three-dimensional scene due to the ray-primitive intersection.

For example, the image processing system may determine if the intersection of the ray and the primitive may cause a reflected ray to be issued (that is if the intersected object has reflective properties), a refracted ray to be issued (if the intersected object has translucent properties), or shadow rays to be issued (if the three-dimensional scene contains light sources). Furthermore, at step 910 the image processing system may also determine the trajectory of the secondary rays to be issued into the three-dimensional scene.

Figure 10:
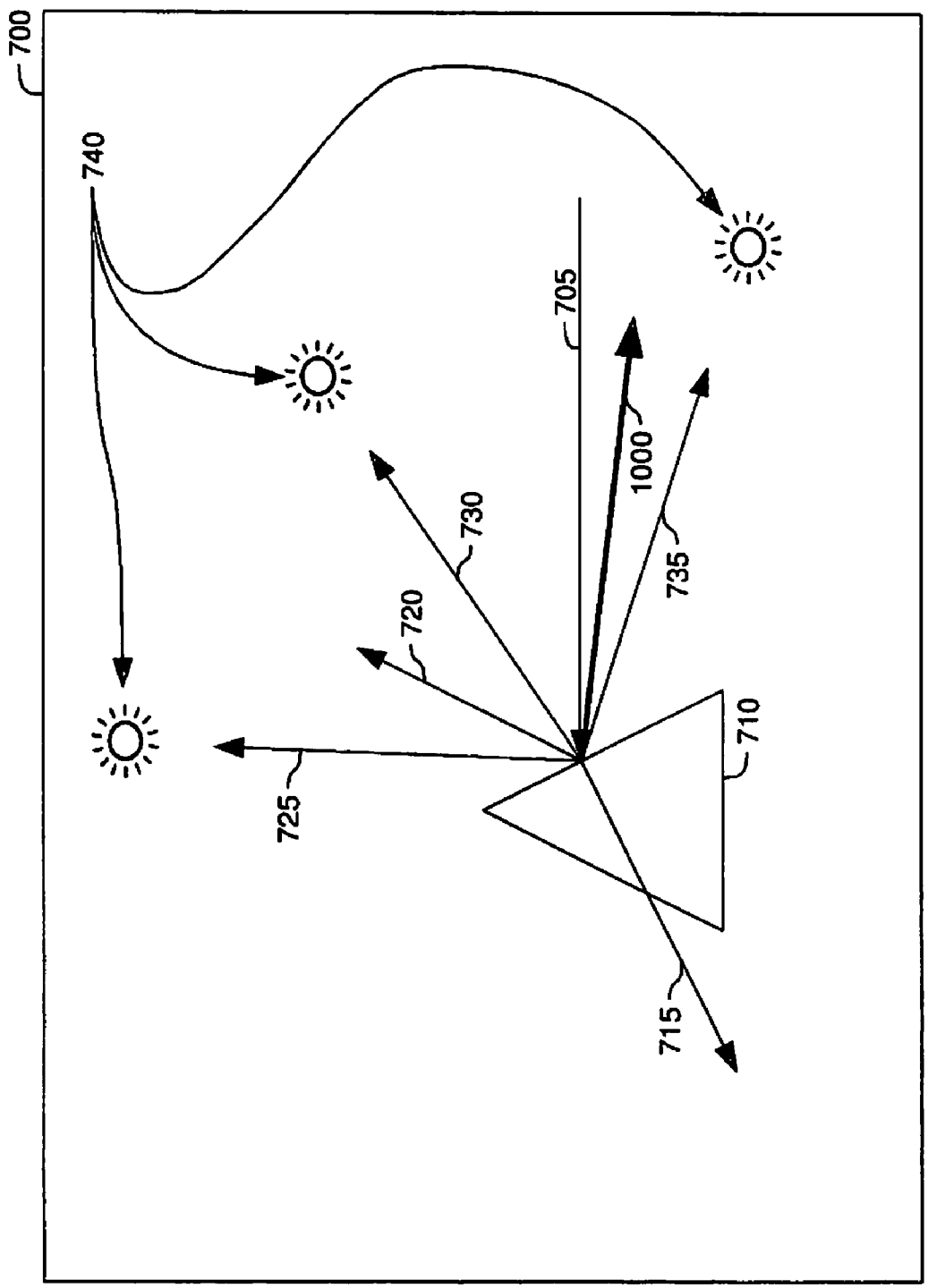

For example, FIG. 10 illustrates the three-dimensional scene 700 described above with respect to FIG. 7. The three-dimensional scene 700 illustrates a previously issued ray (e.g., an original ray or a previously issued secondary ray) intersecting a primitive 710 in the three-dimensional scene. Furthermore, FIG. 10 also illustrates secondary rays which may be issued by the image processing system into the three-dimensional scene. For example, the image processing system may issue a refracted ray 715, a reflected ray 720, and three shadow rays (i.e., 725, 730, and 735) into the three-dimensional scene.

Next, at step 915, the image processing system may determine if additional secondary rays, are to be issued into the three-dimensional scene. The determination of whether or not to issue a stochastic secondary ray is to be issued into the scene may be a stochastic determination in itself. Therefore, according to embodiments of the invention, a stochastic secondary ray may be issued after some ray-primitive intersections and yet no stochastic secondary ray may be issued after other ray-primitive intersections.

According to another embodiment of the invention, a probability may be associated with the determination of whether or not to issue a stochastic secondary ray into the three-dimensional scene, and the probability may be varied based on a number of factors. For example, the probability of issuing a stochastic secondary ray into the three-dimensional scene may depend on the workload being experienced by the image processing system. If the current workload is high, the probability may be decreased such that the additional workload presented to the image processing system when introducing an additional secondary ray is low. In contrast, if the current workload being experienced by the image processing system is low, the probability may be increased such that more stochastic secondary rays are issued into the three-dimensional scene, which may increase the realism of the image rendered by the image processing system.

If no stochastic secondary ray is to be issued into the three-dimensional scene, the image processing system may proceed to step 920 where the image processing system may issue all of the traditional secondary rays into the three-dimensional scene. The image processing system may issue the secondary rays into the three-dimensional scene, for example, by having a vector throughput engine 210 send the issued secondary rays to a workload manager 205 such that the workload manager 205 may traverse the secondary rays through the spatial index.

However, if stochastic secondary rays are to be issued into the scene, the image processing system may proceed to step 925 where the image processing system may calculate the properties of the stochastic secondary rays. A first property of a stochastic secondary ray may be that it originates from the intersection point of the previously issued ray and the primitive. A second property of the stochastic secondary ray may be its trajectory, and the trajectory of the stochastic secondary ray may be determined randomly by the image processing system.

For example, FIG. 10 illustrates an exemplary stochastic secondary ray 1000. As illustrated, the stochastically added secondary ray 1000 originates from the intersection point of the previously issued ray 705 and the primitive 710, and has a randomly determined trajectory. As illustrated in FIG. 10, the trajectory of the stochastic secondary ray 1100 may be one that is different than the trajectory of the other secondary rays (i.e., the reflected ray 715, the refracted ray 720, and the shadow rays 725, 730, and 735). However, since the trajectory may be random, at times the trajectory of the stochastic secondary ray may be the same as a traditional secondary ray (e.g., the same as a reflected ray, refracted ray, or shadow ray).

The stochastically added secondary ray 1000 may intersect objects or primitive within the three-dimensional scene 700 and thus contribute color to the pixel through which an original ray (e.g., the ray 705) passed. This additional color contribution may be different than the traditional ray tracing image processing color determination which is dependent on intersections of the traditional secondary rays (i.e., reflected rays, refracted rays, and shadow rays) and primitives. Consequently, in contrast to the image rendered by the traditional ray tracing image processing system, the stochastic secondary ray may introduce minor imperfections to the image rendered by the traditional ray tracing image processing system. As described above, these minor imperfections may increase the realism of the image rendered by a ray tracing image processing system.

According to another embodiment of the invention, a weighting factor may be associated with the stochastically added secondary ray before the ray is generated. The weighting factor may be used to determine the trajectory of the stochastic secondary ray. This weighting factor may be used to ensure the stochastically added secondary ray has a trajectory different than the other secondary rays. A different trajectory may be desirable to ensure the stochastically added secondary ray is traced to a different portion of the three-dimensional scene than the traditional secondary rays. Thus, the weighting factor may increase the likelihood that the stochastic secondary ray encounters differently colored objects within the three-dimensional scene, thereby increasing the likelihood an imperfection may be added to the final rendered image.

Figure 11:
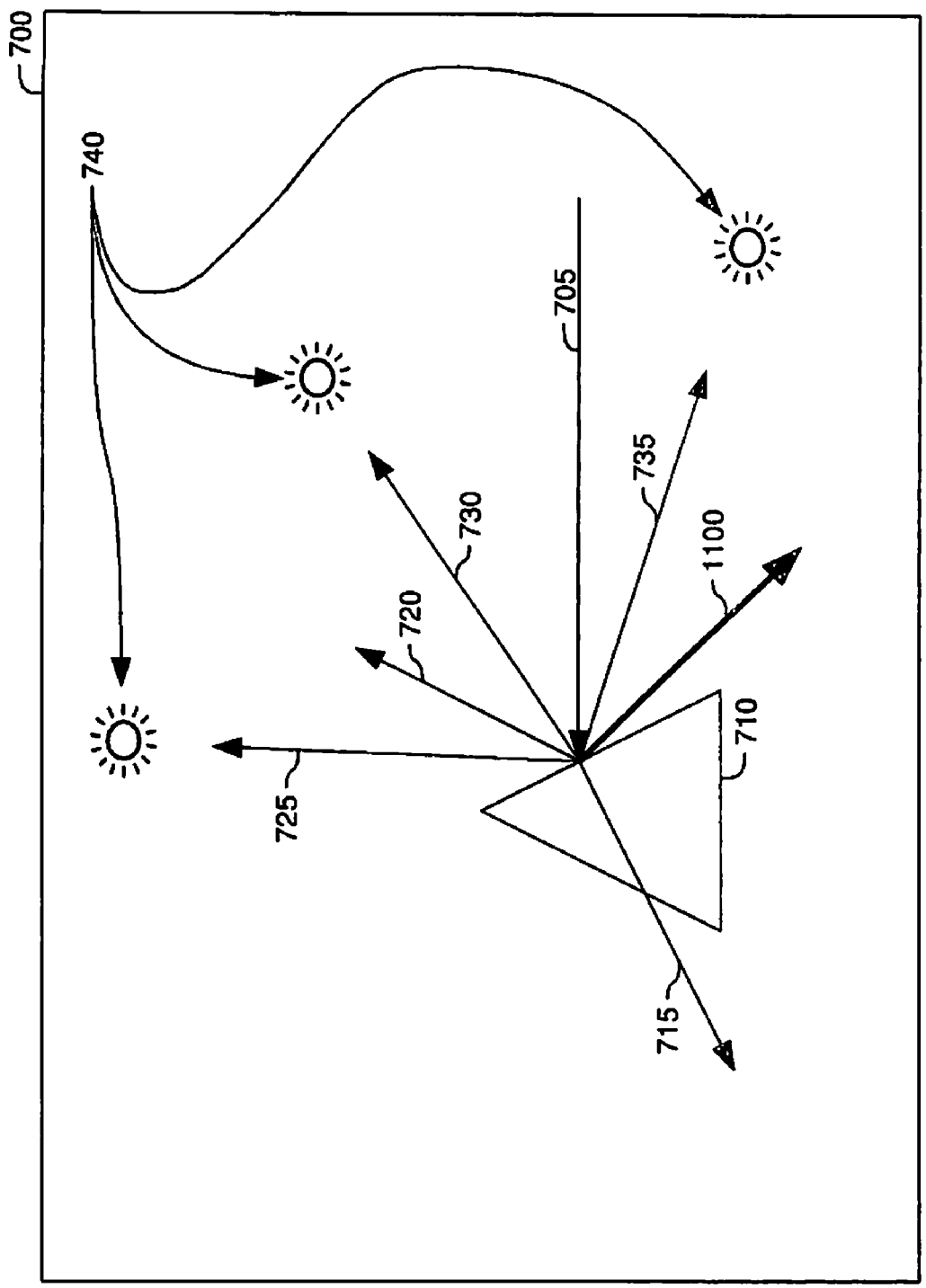

For example, FIG. 11 illustrates an exemplary stochastic secondary ray 1100. As illustrated, the stochastic secondary ray 1100 has a trajectory which is likely to be traced to a different portion of the three-dimensional scene 700. The trajectory of the stochastic secondary ray 1100 may have been in part determined by a weighting factor which prevented the stochastic secondary ray 110 from having a trajectory similar to the other secondary rays (e.g., the refracted ray 715, the reflected ray 720, or the shadow rays 725, 730 and 735). Since the stochastic secondary ray 1100 has a trajectory which is likely to be traced to a different portion of the three-dimensional scene 700, the stochastic secondary ray may have an increased likelihood to intersect an object with a different color than the other secondary rays. Consequently, the color which may be contributed by the stochastic secondary ray 1100 to the pixel through which the original ray passed may be different than the traditional secondary rays, thus providing an imperfection, thereby adding realism to the final rendered image.

Furthermore, the weighting factor may also be used to ensure that the trajectory of the stochastic secondary ray may be selected such that if the stochastic secondary ray intersects an object, the intersected object would in fact contribute color to the primitive from which the stochastic secondary ray originated and thus to the pixel through which an original passed. For example, the weighting factor may be used to ensure that the stochastic secondary ray does not traverse through the primitive from which the stochastic secondary ray originated (e.g., 710) if the primitive is not translucent.

According to another embodiment of the invention, in addition to generating an additional stochastic secondary ray after a ray-primitive intersection, the image processing system may also modify the trajectory of one or more traditional secondary rays. For example, after an intersection of an original ray and a primitive, the image processing system may generate secondary rays including a reflected ray, a refracted ray, shadow rays and a stochastic secondary ray. The image processing system may then randomly select one or more of the reflected, refracted, or shadow rays and modify the selected ray's trajectory. The resulting trajectory of the selected traditional secondary ray may also be randomly determined. Modifying the trajectory of a traditional secondary ray may increase the realism of the image rendered by the ray-tracing image processing system.

The stochastic secondary ray may also be a candidate for stochastic culling of secondary rays as described above with respect to method 600. For example, the stochastically added secondary ray may also be stochastically culled by the image processing system, while the traditional secondary rays are issued into the three-dimensional scene.

Conclusion

By stochastically culling rays before they are issued into the three-dimensional scene, the number of rays which need to be traced by the image processing system may be reduced. Furthermore, by stochastically culling rays before they are issued into the three-dimensional scene, minor imperfections may be introduced into the final image rendered by the ray tracing image processing system. The minor imperfections may improve the realism of the rendered image. Thus, stochastic culling of rays may improve the performance of the image processing system by reducing workload imposed on the image processing system and may improve the realism of the images rendered by the image processing system. Furthermore, according to another embodiment of the invention, the realism of images rendered by the image processing system may also be improved by stochastically adding secondary rays after ray-primitive intersections have occurred. The stochastic addition of rays after ray-primitive intersections may add minor imperfections to the final image rendered by the ray tracing image processing system, thereby improving the realism of the rendered image.

While the foregoing is directed to embodiments of the present invention, other and further embodiments of the invention may be devised without departing from the basic scope thereof, and the scope thereof is determined by the claims that follow.

What is claimed is:

1. A method of performing ray tracing, the method comprising:
issuing an original ray into a three-dimensional scene;
determining whether the original ray intersects any primitive contained within the three-dimensional scene; and
upon determining that the original ray intersects a primitive contained within the three-dimensional scene:
generating, by operation of one or more computer processors, a first plurality of secondary rays comprising one or more of a reflected ray, a refracted ray and a shadow ray; and
issuing a superset of secondary rays into the three-dimensional scene, wherein the superset includes one or more of the first plurality of secondary rays and one or more additional secondary rays issued from a point the original ray intersects the primitive, each additional secondary ray having a trajectory that is stochastically determined, and wherein a count of the one or more additional secondary rays is based at least in part on system load.

2. The method of claim 1, further comprising:
assigning a weighting factor to the one or more additional secondary rays, wherein the trajectory for each additional secondary ray is based at least in part on the weighting factor.

3. The method of claim 1, wherein the original ray passes through a pixel when issued into the three-dimensional scene, and wherein the method further comprises:
determining whether the one or more additional secondary rays intersect one or more primitives contained within the three-dimensional scene; and
upon determining that the one or more additional secondary rays intersect one or more primitives, updating a color of the pixel based on colors of one or more intersected primitives.

4. The method of claim 1, further comprising:
determining whether at least one of the first plurality of secondary rays is to be stochastically deleted; and
upon determining that at least one of the first plurality of secondary rays is to be stochastically deleted, stochastically deleting at least one of the first plurality of secondary rays.

5. The method of claim 1, further comprising:
stochastically modifying the trajectory of at least one of the first plurality of secondary rays.

6. The method of claim 1, wherein the trajectory of each additional secondary ray is different from each of the first plurality of secondary rays.

7. The method of claim 1, wherein the count of the one or more additional secondary rays bears an inverse relationship to the system load.

8. The method of claim 2, wherein the weighting factor is based at least in part on a trajectory of one or more of the first plurality of secondary rays.

9. A non-transitory computer readable medium containing a program which, when executed, performs operations comprising:
issuing an original ray into a three-dimensional scene;
tracing the original ray through a spatial index having nodes representing bounding volumes within the three-dimensional scene by taking branches to nodes defining bounding volumes intersected by the original ray until a first leaf node is reached; and
performing ray-primitive intersection tests to determine whether the original ray intersects a primitive contained within a bounding volume defined by the first leaf node; and
upon determining that the original ray intersects a primitive contained in the bounding volume:
generating a first plurality of secondary rays comprising at least one of a reflected ray, a refracted ray, and a shadow ray;
determining whether one or more additional secondary rays are to be generated; and
upon determining that one or more additional secondary rays are to be generated, generating one or more additional secondary rays to be issued from a point the original ray intersects the primitive, wherein additional secondary ray has a trajectory that is stochastically determined, and wherein a count of the one or more additional secondary rays is based at least in part on system load.

10. The non-transitory computer readable medium of claim 9, wherein the operations further comprise:
assigning a weighting factor to the one or more additional secondary rays, wherein the trajectory for each additional secondary ray is based at least in part on the weighting factor.

11. The non-transitory computer readable medium of claim 9, wherein the original ray passes through a pixel when issued into the three-dimensional scene, and wherein the operations further comprise:
for each additional secondary ray:
traversing the additional secondary ray through the spatial index by taking branches to nodes representing bounding volumes intersected by the additional secondary ray until a leaf node is reached;
determining whether the additional secondary ray intersects a primitive contained within a bounding volume defined by the leaf node; and
upon determining that the additional secondary ray intersects a primitive contained within a bounding volume defined by the leaf node, updating a color of the pixel based on the color of the primitive intersected by the additional secondary ray.

12. The non-transitory computer readable medium of claim 9, wherein the operations further comprise:
determining whether at least one of the first plurality of secondary rays is to be stochastically deleted; and
upon determining that at least one of the first plurality of secondary rays is to be stochastically deleted, stochastically deleting at least one of the first plurality of secondary rays.

13. The non-transitory computer readable medium of claim 9, wherein the operations further comprise stochastically modifying the trajectory of at least one of the first plurality of secondary rays.

14. The non-transitory computer readable medium of claim 9, wherein the count of the one or more additional secondary rays bears an inverse relationship to the system load.

15. The non-transitory computer readable medium of claim 10, wherein the weighting factor is based at least in part on a trajectory of one or more of the first plurality of secondary rays.

16. An image processing system comprising:
a spatial index having nodes representing bounding volumes within a three-dimensional scene;
a first processing element configured to:
issue an original ray into the three-dimensional scene;
traverse the original ray through the spatial index by taking branches to nodes representing bounding volumes intersected by the original ray until a first leaf node is reached; and
send the original ray to a second processing element; and
a second processing element configured to:
perform ray-primitive intersection tests to determine whether the original ray intersects a primitive contained within a bounding volume defined by the first leaf node; and
upon determining that the original ray intersects a primitive contained in the bounding volume:
generate a first plurality of secondary rays comprising at least one of a reflected ray, a refracted ray, and a shadow ray;
determine whether one or more additional secondary rays are to be generated; and
upon determining that one or more additional secondary rays are to be generated, generate one or more additional secondary rays to be issued from a point the original ray intersects the primitive, wherein each additional secondary ray has a trajectory that is stochastically determined, and wherein a count of the one or more additional secondary rays is based at least in part on system load.

17. The image processing system of claim 16, wherein the second processing element is further configured to assign a weighting factor to the one or more additional secondary rays, wherein the trajectory for each additional secondary ray is based at least in part of the weighting factor.

18. The image processing system of claim 16, wherein the weighting factor is based at least in part on a trajectory of one or more of the first plurality of secondary rays.

19. The image processing system of claim 16,
wherein the original ray passes through a pixel as it is issued into the three-dimensional scene, and
wherein for each additional secondary ray:
the first processing element is further configured to traverse the additional secondary ray through the spatial index by taking branches to nodes representing bounding volumes intersected by the additional secondary ray until a leaf node is reached, and send the additional secondary ray and information which defines the leaf node to the second processing element; and
the second processing element is further configured to determine whether the additional secondary ray intersects a primitive contained within the bounding volume defined by the leaf node, and upon determining that the additional secondary ray intersects a primitive contained within a bounding volume defined by the leaf node, update a color of the pixel based on the color of the primitive intersected by the additional secondary ray.

20. The image processing system of claim 16, wherein the second processing element is further configured to:
determine whether at least one of the first plurality of secondary rays is to be stochastically deleted; and
upon determining that at least one of the first plurality of secondary rays is to be stochastically deleted, stochastically delete at least one of the first plurality of secondary rays.

21. The image processing system of claim 16, wherein the count of the one or more additional secondary rays bears an inverse relationship to the system load.

* * * * *